United States Patent

[11] 3,602,597

[72] Inventor Donald P. Sproul
 Boulder Creek, Calif.
[21] Appl. No. 858,750
[22] Filed Sept. 17, 1969
[45] Patented Aug. 31, 1971
[73] Assignee Durrum Instrument Corporation
 Palo Alto, Calif.

[54] DIFFERENTIAL CIRCULAR DICHROISM MEASURING APPARATUS
2 Claims, 6 Drawing Figs.

[52] U.S. Cl. ................................................ 356/117,
 250/225, 356/114
[51] Int. Cl. ............................................. G01n 21/40
[50] Field of Search ..................................... 356/114–117;
 350/154, 157; 250/225

[56] References Cited
UNITED STATES PATENTS
2,986,066  5/1961  Rouy ............................ 356/116
3,390,605  7/1968  Nagamura .................... 356/117

Primary Examiner—Ronald L. Wibert
Assistant Examiner—J. Rothenberg
Attorney—Flehr, Hohbach, Test, Albritton & Herbert ABSTRACT: A circular dichroism (CD) and/or optical rotatory dispersion (ORD) measuring apparatus having half-wave retardation means and a reference cell inserted in the light beam to convert the apparatus to measure differential CD and/or ORD is disclosed.

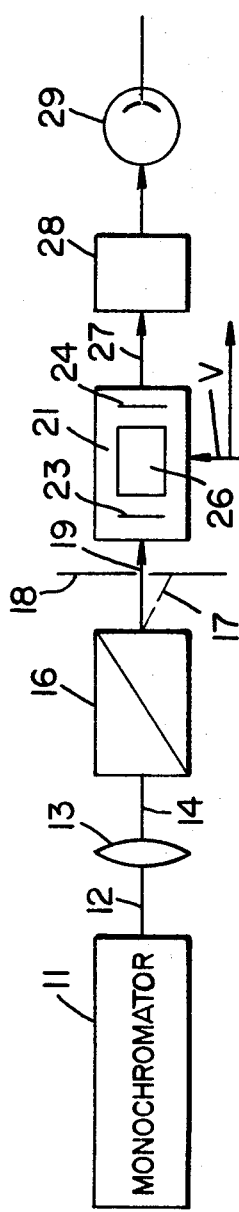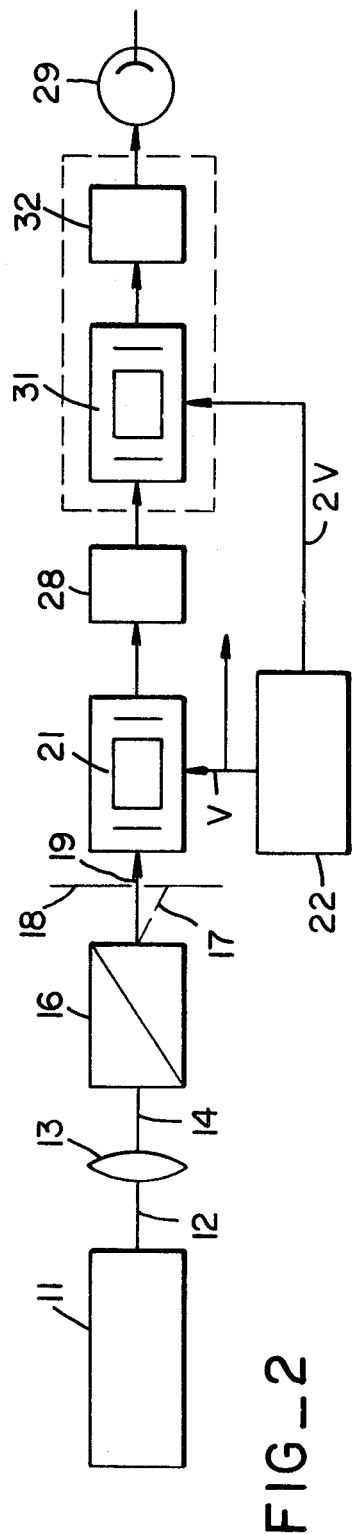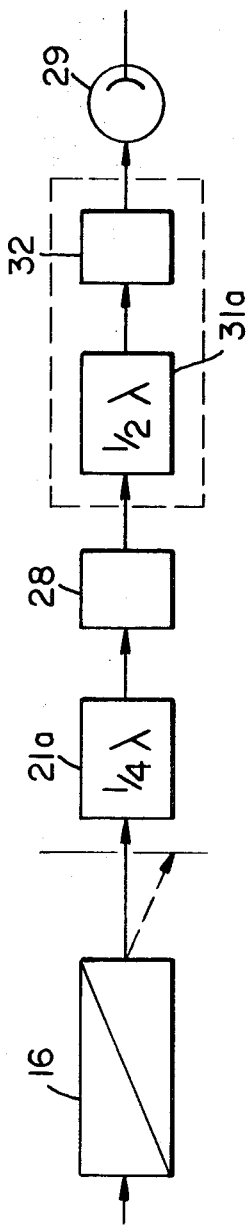

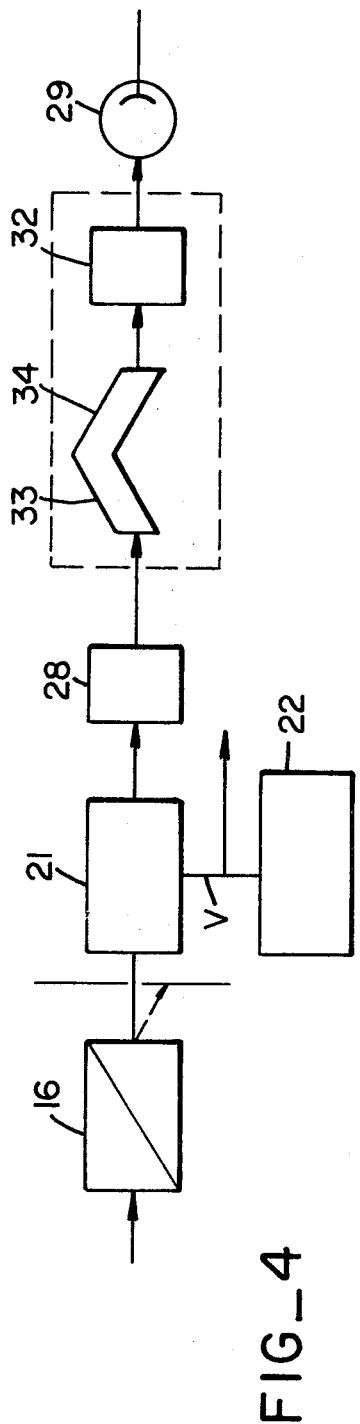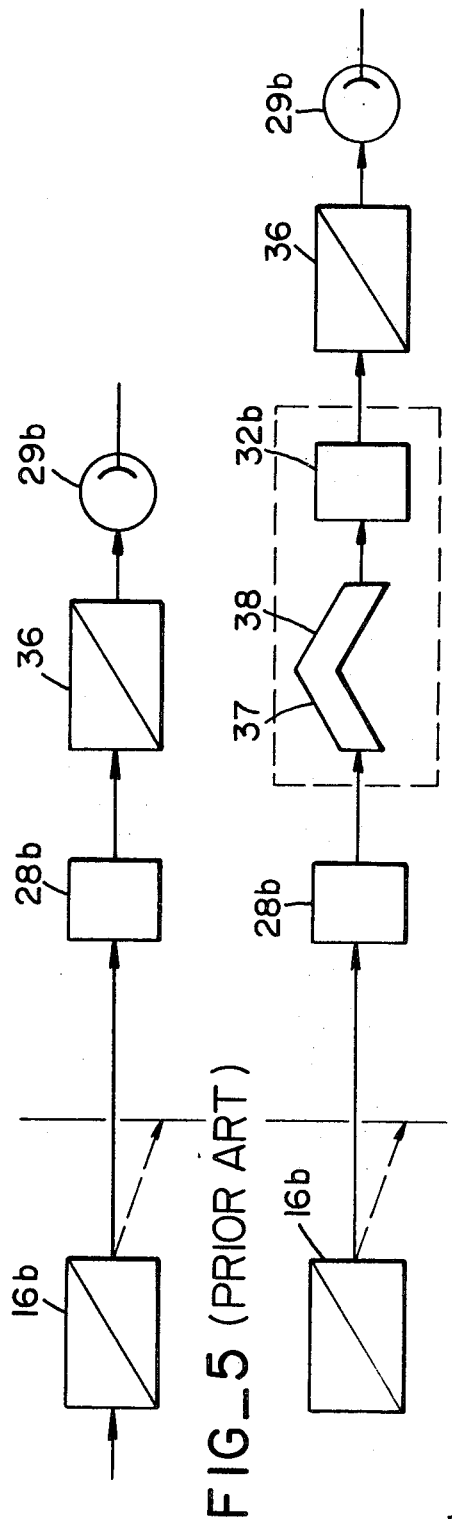
FIG_4
FIG_5 (PRIOR ART)
FIG_6
INVENTOR.
DONALD P. SPROUL

DIFFERENTIAL CIRCULAR DICHROISM MEASURING APPARATUS

BACKGROUND OF THE INVENTION

This invention relates generally to apparatus for measuring circular dichroism and/or optical rotatory dispersion, and more particularly to an apparatus for measuring differential circular dichroism and/or optical rotatory dispersion.

The measurement of differential circular dichroism in the prior art has generally necessitated the use of double beam systems and multiple runs. The measurement of differential optical rotatory dispersion has necessitated multiple beam and reflected beam systems.

SUMMARY OF THE INVENTION AND OBJECTS

It is a general object of the present invention to provide an improved and simplified apparatus for measuring differential circular dichroism and optical rotatory dispersion.

Generally, the objects of the present invention are achieved by an apparatus which includes means for projecting a light beam, either circularly or linearly polarized, to a sample and in which means are introduced to intercept the beam leaving the sample and provide half-wave retardation. The emergent beam is then caused to impinge upon a reference cell which is identical to the sample cell and the output from the cell is applied to a phototransducer whereby if the sample and reference have identical circular dichroism or optical rotatory dispersion, the signals cancel, and if they are different, a difference signal is generated.

BRIEF DESCRIPTION OF THE DRAWINGS

FIG. 1 shows an apparatus for measuring circular dichroism in accordance with the prior art.

FIG. 2 shows an apparatus for measuring differential circular dichroism incorporating the present invention.

FIG. 3 shows another embodiment of a portion of the apparatus shown in FIG. 2.

FIG. 4 shows still another embodiment of a portion of the apparatus shown in FIG. 2.

FIG. 5 shows an apparatus for measuring optical rotatory dispersion in accordance with the prior art.

FIG. 6 shows an apparatus for measuring differential optical rotatory dispersion incorporating the present invention.

DESCRIPTION OF PREFERRED EMBODIMENTS

FIG. 1 shows a prior art system used to measure circular dichroism. The system includes a source of monochromatic light such as a monochromator 11 which produces a monochromatic light beam 12. The beam impinges upon a collimating lens system 13 which serves to collimate the monochromatic light beam to provide collimated monochromatic light beam 14. A Rochon prism or polarizer 16 intercepts the beam 14 and produces two beams polarized at right angles with respect to one another. The extraordinary beam 17 is intercepted by a diaphragm 18. The ordinary beam 19 is applied to a Pockels effect cell 21 which is electrically energized by voltage V having a frequency $f$. The amplitude of the voltage is such as to produce periodically left-and-right circularly polarized light. The voltage is derived in voltage programmer 22. In a typical instance, the voltage may have the line frequency, such as 60 cycle. A Pockels cell usually includes two spaced metallic electrodes 23, 24 disposed on two faces of a crystal 26 to produce in the direction of the traverse of the light beam a birefringence which is increased as the voltage increases. By appropriately selecting the voltage, the emergent beam 27 will be alternately right-and-left circularly polarized. The beam 27 is then applied to the sample cell 28 and the transmitted light received by a photomultiplier or other electro-optical transducer.

The output from the transducer may be applied to an electronic system of the type shown and described in my copending application Ser. No. 581,232, now Pat. No. 3,512,001 filed Sept. 22, 1966, and entitled "Differential Absorption Measuring System," or in a system of the type incorporated in the Jasco Model ORD–CD5 distributed and sold in the United States by Durrum Instruments Corporation, Palo Alto, California, to provide a reading or measure of the circular dichroism (CD) of the sample under test.

In accordance with the present invention, the apparatus is modified to provide means for measuring differential circular dichroism which is essentially the simultaneous subtraction of circular dichroism of one sample from that of another. The present invention can be used, for example, to subtract the effects of an optically active solvent from an active or inactive sample and is especially useful for recording the differences in fine structures and the circular dichroism (CD) signals of two related samples.

Briefly, the prior art apparatus is modified by adding an additional Pockels cell or other half wave retardation system and a second sample cell. Referring to FIG. 2, like reference numerals are applied to the parts which are the same as those of FIG. 1. The apparatus provides a left and right circularly polarized beam at the sample cell 28. If the sample is optically active, it will absorb either the left or right-hand component of the circularly polarized light by a greater amount than the other component. The beam is applied to a second Pockels cell 31 which is driven by a voltage which is twice the amplitude of the voltage V driving the first cell and at the same frequency and in phase. The second Pockels cell then becomes a half wave retardation plate. The polarization of the light passing out of this cell is 180° out of phase with the incoming polarization so that when the left circularly polarized light is entering the Pockels cell, right circularly polarized light exits. The emergent beam is applied to a second sample 32 contained in an identical cell which serves as a reference active or inactive sample. The second sample acts upon the light. If identical samples are placed in the sample and reference cells S and R and, for example, they both absorb left circularly polarized components of light to a greater degree than right circularly polarized components, the light reaching the phototransducer 29 will remain constant since the left-hand component is alternately absorbed to a greater degree by the first sample and then by the reference sample. Under these conditions, the photomultiplier will have a zero CD output, that is, a zero alternating current frequency component. If the two samples are not identical, only the difference in circular dichroism of the two samples is measured.

FIG. 3 shows an apparatus similar to that of FIG. 2. However, the first and second Pockels cells are replaced by quarter-wave and half-wave retardation plates, respectively. In other respects, the system operates identically and like reference numerals are applied to like parts. The quarter-wave plate 21a is either mechanically rotated or electrically driven (not shown) to produce left-and-right circularly polarized light in the same manner as does cell 21. The light beam leaving the half wave retardation plate will be 180° out-of-phase with the incident light and is applied to the second sample cell 32 serving as a reference active or inactive sample. In FIG. 4, still another system is shown in which the second Pockels cell 31 is replaced by two Fresnel rhombs 33, 34 positioned in the beam to provide half-wave retardation. In each instance the output from the photomultiplier tube 29 is applied to associated apparatus of the type as described in my pending application or in the Jasco ORD–CD5, or the like, to provide output signals.

Referring to FIG. 5, there is shown a diagram of a prior art optical rotatory dispersion (ORD) apparatus. In optical rotatory dispersion, the polarized light from the Rochon prism 16b is applied to the sample and a second prism 36 is disposed to receive the transmitted light. In operation, the second prism 36 is rotated until the light is extinguished as indicated by the output from the phototransducer 29b. The rotation of the second prism 36 is an indication of the rotatory dispersion of the sample.

In many instances it is desirable to be able to measure differential rotatory dispersion. The principle of the present invention is directly applicably to measuring differential optical rotatory dispersion. Thus, the output of the Rochon prism is applied to the first sample 28b and then is applied to a half wave retardation device such as a Pockels cell, half-wave plate or two Fresnel rhombs 37, 38. The output of the Fresnel rhombs is applied to a reference cell 32b, and thence to the second prism 36. The 180° retardation will serve to completely cancel out the rotatory dispersions if the sample and reference are identical. If they are not identical, then the differential rotatory dispersion is read.

Thus, there has been provided a simple attachment for prior art CD and ORD apparatus to provide differential CD and ORD measurements.

I claim:

1. Apparatus for providing a measurement of the difference between the circular dichroism of a sample and a reference material including means forming a beam of polarized light, means for alternately right-and-left circularly polarizing the beam, a sample cell for presenting sample material to said right-and-left circularly polarized beam whereby the beam traverses the sample material, means for receiving the emergent beam and retarding the components of the beam one-half wave length, a reference cell for presenting the reference material to said retarded beam so that the beam traverses the reference material whereby the circular dichroism effect of said reference is simultaneously subtracted from that of said sample, and transducer means for receiving the emergent beam from the reference material and forming an electrical signal.

2. Apparatus for providing a measurement of the difference between the optical rotary dispersion of a sample and a reference material including means forming a beam of polarized light, a sample cell for presenting the sample material to said beam whereby the beam traverses the sample material, means for receiving the emergent beam and retarding the beam one-half wavelength, a reference cell for presenting the reference material to said retarded beam so that the beam traverses the reference material whereby the optical rotary dispersion effect of said reference is simultaneously subtracted from that of said sample, and an analyzer prism for analyzing said light and providing an indication of the difference of optical rotary dispersion.